United States Patent [19]
Hibbert et al.

[11] 3,709,628
[45] Jan. 9, 1973

[54] TWIST DRILLS

[75] Inventors: Charles Hibbert, Sheffield; Frederick Arthur Kirk, Moorgate; Keith Siddall, Gleadless; Michael Roi Howard, Brentwood, all of England

[73] Assignee: Osborn-Mushet Tools Limited, Sheffield, England

[22] Filed: Oct. 19, 1970

[21] Appl. No.: 81,903

[30] Foreign Application Priority Data

Oct. 20, 1969 Great Britain..................51,368/69

[52] U.S. Cl....................................................408/229
[51] Int. Cl. ............................................B23b 51/02

[58] Field of Search...............408/230, 229, 228, 227

[56] References Cited

UNITED STATES PATENTS

| 2,859,645 | 11/1958 | Emmons et al. | 408/230 |
| 2,328,629 | 9/1943 | Eich et al. | 408/230 |
| 750,537 | 1/1904 | Hanson | 408/230 |

*Primary Examiner*—Gil Weidenfeld
*Attorney*—Lackenbach & Lackenbach

[57] ABSTRACT

A twist drill having a point angle within the range of 55° to 73°, a helix angle within the range of 10° to 20°, and a web thickness within the range of 18.5 to 25 percent of the drill diameter.

12 Claims, 2 Drawing Figures

PATENTED JAN 9 1973
3,709,628
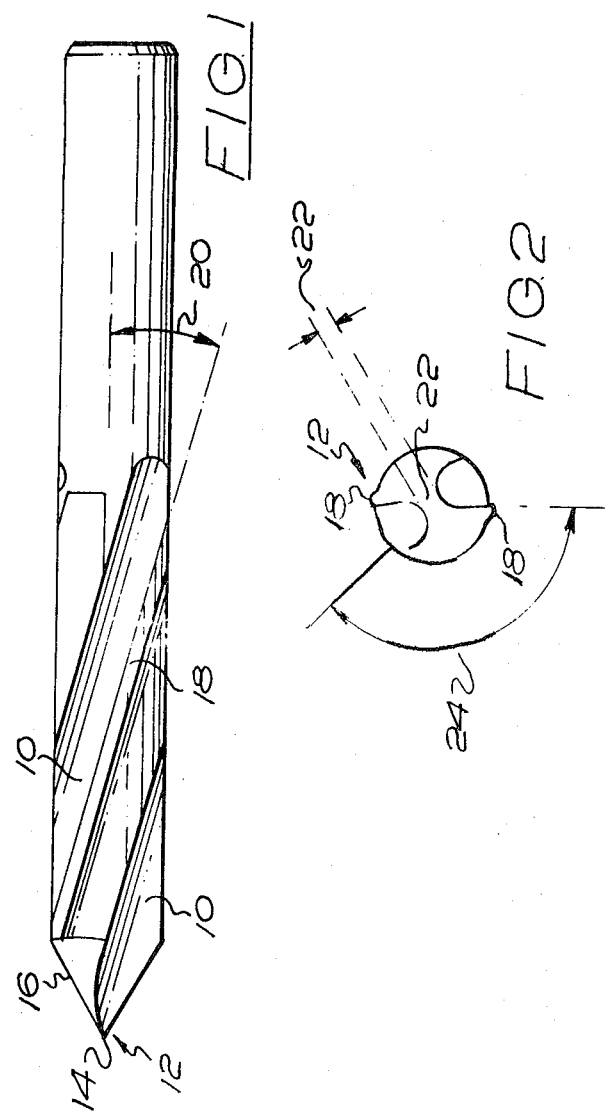
CHARLES HIBBERT
FREDERICK ARTHUR KIRK
KEITH SIDDALL
MICHAEL ROI HOWARD
INVENTORS
BY Rachenbach & Rachenbach
ATTORNEYS

TWIST DRILLS

This invention relates to twist drills, in particular but not exclusively to drills intended for drilling grey cast iron, and has for its object to provide improvements therein.

According to the invention there is provided a twist drill having a point angle within the range of 55° to 73°, a helix angle within the range of 10° to 20°, and a web thickness within the range of 18.5 to 25 percent of the drill diameter. Desirably the point angle is within the range of 58° to 62°, or better still the point angle is 60°. Desirably the helix angle is within the range of 13° to 18°, or better still within the range of 14° to 16°, but preferably the helix angle is 15°. Desirably the web thickness is within the range of 19 to 24 percent, or better still within the range of 20 to 22 percent, but preferably it is 21 percent of the drill diameter. Desirably the drill is made of a steel of which the composition falls within the ranges specified in line I of the table set out below or better still within any of the ranges specified in lines II to IV of the table, but preferably is of any of the compositions specified in lines V to VII of the table (that specified in line VII being at present thought best and in line VI nearly as good). Desirably the steel may also be of a composition as specified in any one of lines VIII to XII of the table.

TABLE.—REFERRED TO ABOVE

| Line | C, carbon | CR, chrome | W, tungsten | Mo, molybdenum | V, vanadium | Co, cobalt | Si, silicon | Mn, manganese |
|---|---|---|---|---|---|---|---|---|
| I | .65/1.65 | 2.0/6.0 | 0–25 | 0–15 | 0/7 | 0/15 | 0/1.0 | 0/1.0 |
| II | .65/.90 | 3.0/4.8 | 17/23 | 0/1.5 | 1.0/2.5 | 9/15 | | |
| III | .75/1.2 | 3.5/4.8 | 5.5/7.0 | 4.5/6.0 | 1.6/2.1 | 0/1.0 | | |
| IV | .95/1.2 | 3.2/4.8 | .90/2.1 | 7.5/10.5 | .95/1.35 | 7.5/10.5 | | |
| V | 1.07 | 3.7 | 1.6 | 9.7 | 1.2 | 8.3 | | |
| VI | .83 | 4.2 | 6.5 | 5.0 | 1.9 | | | |
| VII | .82 | 4.4 | 21.75 | | 1.5 | 12.0 | | |
| VIII | .75 | 4.25 | 18.0 | | 1.25 | | | |
| IX | 1.55 | 4.75 | 6.5 | 3.0 | 5.0 | 5.0 | | |
| X | 1.35 | 4.0 | 9.0 | 3.0 | 3.0 | 9.5 | | |
| XI | .80 | 4.8 | 18.25 | | 1.25 | 5.0 | | |
| XII | .80 | 3.75 | 1.7 | 8.75 | 1.15 | | | |

In the table, the figures represent percentages by weight the balance being made up of iron, other compatible constituents and impurities (if any).

Desirably, the drill is made from steel which has been refined by a consumable electrode process such as vacuum arc remelting or preferably electro-slag refining.

In order that the invention may be clearly understood and readily carried into effect, the same will now be described, by way of example only, with reference to the accompanying drawings in which:-

FIG. 1 shows a side elevation of ¼ inch twist drill, and,

FIG. 2 is an end view of its point.

The drill shown in the drawing is of ¼ inch diameter and 3¼ inches in overall length, and has two flutes 10 extending along 1½ inches of its length, i.e., along 50 percent or less of its length. Thus the drill may be regarded as a stub drill. The drill has a point generally designated 12 formed by a tip 14 and two flanks 16. The point angle, i.e. the angle subtended by the flanks 16 at the tip 14 is 60°. The flutes 10 are formed with cylindrical lands 18 and these describe a helix with respect to the axis of the drill; the helix angle, i.e. the angle between the lands 18 and a diametrical plane of the drill is 15° as indicated at 20. The web thickness, i.e. the thickness of the drill between the flutes as shown at 22 is 0.0525 inch with a tolerance of ± 0.0025 inch; thus it represents 21 percent ± 1 percent (i.e. 20 to 22 percent) of the drill diameter. The tip 14 is formed in customary manner with a chisel point 22 (see FIG. 2) and this is set at an angle of 125° to the leading edge of the lands 18; the chisel edge angle is indicated at 24.

The drill is made from steel having the composition specified in line VII of the table set out above. This will have been subjected to a form of consumable electrode remelting namely electro-slag refining.

Another form of drill is identical to that described above save that it is made from steel of the composition specified in line VI of the table.

The twist drills described above, it is thought, will perform particularly well for the purpose of drilling grey cast iron and exhibit a life between required regrinding far in excess of presently used twist drills for this purpose.

It will be appreciated that modifications may be made from the particular forms of drill described above without departing from the scope of the invention. In particular although the point angle is desirably 60° it may be anywhere within the range of 55° to 73° but desirably within the range 58° to 62°. Similarly although in the preferred embodiment the helix angle is 15° it may lie anywhere within the range of 13° to 18° but desirably within the range of 14° to 16°. The web thickness could lie anywhere within the range 19 to 24 percent of the drill diameter although as previously indicated it is preferred that it should lie within the range of 20 to 22 percent and ideally should be 21 percent of the drill diameter where the drill diameter is up to 1½ inches in diameter. In drills 1½ inches or larger, the web thickness is desirably proportionally somewhat less down to the lower limit previously referred to, viz: 19 percent of the drill diameter. Furthermore, a drill embodying the invention may be made from a grade of high speed steel other than of the compositions described above.

What we claim and desire to secure by Letters Patent is:

1. A twist drill particularly adapted for drilling grey cast iron having a point angle within the range of 55° to 73°, a helix angle within the range of 10° to 20°, and a web thickness within the range of 18.5 to 25 percent of the drill diameter.

2. A twist drill according to claim 1, in which the point angle is within the range of 58° to 62°.

3. A twist drill according to claim 1, in which the helix angle is within the range of 13° to 18°.

4. A twist drill according to claim 1 in which the helix angle is within the range of 14° to 16°.

5. A twist drill according to claim 1, in which the web thickness is within the range of 20 to 22 percent of the drill diameter.

6. A twist drill according to claim 2 in which the helix angle is within the range of 13° to 18°.

7. A twist drill according to claim 2 in which the web thickness is within the range of 20 to 22 percent of the drill diameter.

8. A twist drill according to claim 1 in which the helix angle is approximately 15°.

9. A twist drill according to claim 2 in which the helix angle is approximately 15°.

10. A twist drill according to claim 1 in which the point angle is approximately 60°.

11. A twist drill according to claim 10 in which the helix angle is approximately 15°.

12. A twist drill according to claim 11 in which the drill comprises a high speed steel.

* * * * *